United States Patent
Glimcher

(10) Patent No.: US 12,417,192 B2
(45) Date of Patent: Sep. 16, 2025

(54) SYSTEM AND METHOD FOR NETWORK INTERFACE CONTROLLER BASED DATA MIGRATION

(71) Applicant: Dell Products L.P., Round Rock, TX (US)

(72) Inventor: Boris Glimcher, Tel Aviv-Jaffa (IL)

(73) Assignee: Dell Products L.P., Round Rock, TX (US)

( * ) Notice: Subject to any disclaimer, the term of this patent is extended or adjusted under 35 U.S.C. 154(b) by 822 days.

(21) Appl. No.: 17/723,049

(22) Filed: Apr. 18, 2022

(65) Prior Publication Data

US 2023/0333996 A1 Oct. 19, 2023

(51) Int. Cl.
*G06F 13/10* (2006.01)
*G06F 9/50* (2006.01)
*G06F 12/0884* (2016.01)

(52) U.S. Cl.
CPC .......... *G06F 13/105* (2013.01); *G06F 9/5016* (2013.01); *G06F 12/0884* (2013.01); *G06F 2213/3808* (2013.01)

(58) Field of Classification Search
None
See application file for complete search history.

(56) References Cited

U.S. PATENT DOCUMENTS

| | | | |
|---|---|---|---|
| 6,598,174 B1* | 7/2003 | Parks | G06F 11/008 714/E11.085 |
| 11,743,122 B1* | 8/2023 | Bayless | H04L 41/145 709/220 |
| 2011/0145471 A1* | 6/2011 | Corry | G06F 9/4856 718/1 |
| 2014/0033201 A1* | 1/2014 | Dawkins | G06F 9/45558 718/1 |
| 2019/0163586 A1* | 5/2019 | McBride | G06F 11/0712 |
| 2021/0232331 A1* | 7/2021 | Kannan | G06N 20/00 |
| 2021/0334124 A1* | 10/2021 | Liu | G06F 9/45558 |
| 2021/0334157 A1* | 10/2021 | Kannan | G06F 3/0619 |
| 2022/0066806 A1* | 3/2022 | Ramanathan | G06F 9/45558 |

* cited by examiner

*Primary Examiner* — Edward J Dudek, Jr.
*Assistant Examiner* — Ralph A Verderamo, III
(74) *Attorney, Agent, or Firm* — WOMBLE BOND DICKINSON (US) LLP

(57) ABSTRACT

Methods and systems for managing storage of data in a distributed system are disclosed. To manage storage of data in a distributed system, a data processing system may include a network interface controller (NIC). The network interface controller may present emulated storages that may be used for data storage. The emulated storage devices may utilize storage resources of storage devices. Overtime, the data stored in various data storages may be migrated between the data storages. To migrate the data, the NIC may manage the migration process. To do so, the NIC may obtain various access requests (e.g., writes, reads) and process them in a manner that allows for the migration to be transparent. By doing so, migrations that are transparent to compute resources of data processing systems may be completed.

20 Claims, 5 Drawing Sheets

SYSTEM AND METHOD FOR NETWORK INTERFACE CONTROLLER BASED DATA MIGRATION

FIELD OF THE DISCLOSED EMBODIMENTS

Embodiments disclosed herein relate generally to data storage. More particularly, embodiments disclosed herein relate to systems and methods for network interface controller based migration of data between storages.

BACKGROUND

Computing devices may store data and used stored data. For example, computing devices may utilize data when providing computer implemented services. Different computing devices may perform similar and/or different functions. The components of computing devices may generate data that may be relevant to future operations. The data may be used during the future operations.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
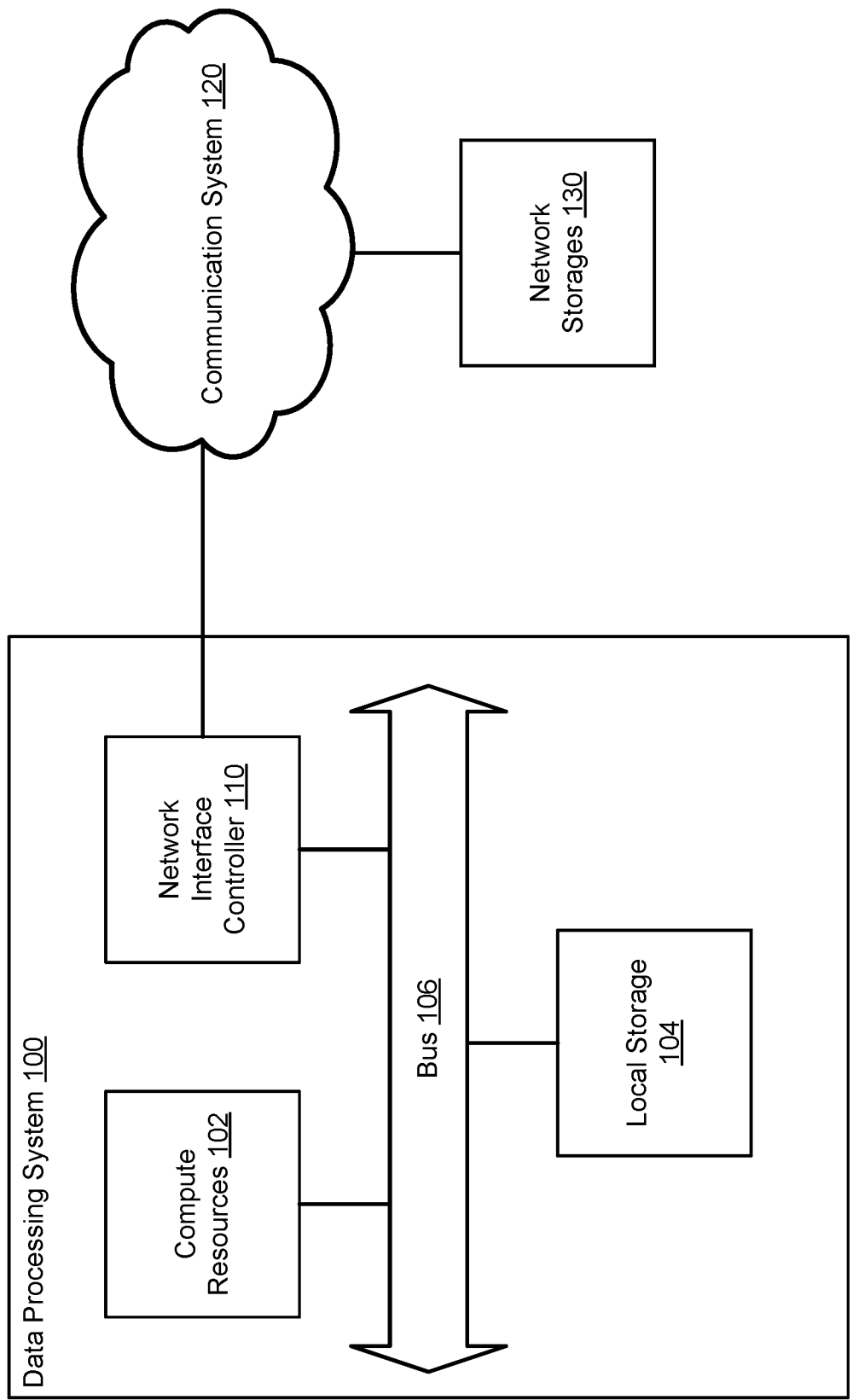
FIG. 1 shows a block diagram illustrating a data processing system in accordance with an embodiment.

Various embodiments and aspects disclosed herein will be described with reference to details discussed below, and the accompanying drawings will illustrate the various embodiments. The following description and drawings are illustrative of the embodiments disclosed herein and are not to be construed as limiting the embodiments disclosed herein. Numerous specific details are described to provide a thorough understanding of various embodiments of embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing storage of data in a distributed system. To manage storage of data in a distributed system, a data processing system may include a network interface controller (NIC). The network interface controller may present emulated storages that may be used for data storage. The emulated storage devices may utilize storage resources of storage devices.

Overtime, the data stored in various data storages may be migrated between the data storages. To migrate the data, the NIC may manage the migration process. To do so, the NIC may obtain various access requests (e.g., writes, reads) and process them in a manner that allows for the migration to be transparent. For example, access to the data may go unimpeded during the migration.

To do so, in manner transparent to compute resources of the data processing system, the NIC may automatically mirror writes between a source and a destination, selectively read and write data from the source and to the destination, direct reads to the source or destination based on data availability and/or workloads, and maintain management data that maps the synchronization data between data in the source and destination.

By doing so, migrations that are transparent to compute resources of data processing systems may be completed.

In an embodiment, a computer-implemented method for managing data storage in a distributed system is disclosed. The method may include obtaining, by a Network Interface Controller (NIC) of a data processing system and from a control plane, a migration request for a source and a destination; based on the migration request and to perform a migration: mirroring, by the NIC, writes for an emulated storage presented by the NIC to both the source and the destination while the migration is being performed; directing, by the NIC, reads for the emulated storage to the source while the migration is being performed; and selectively reading, by the NIC, data from the source and writing, by the NIC, the selectively read data to the destination until the destination is synchronized with the source to complete the migration.

The reads and writes may be obtained from compute resources of the data processing system and to which the NIC presents the emulated storage.

The control plane may be hosted by a device separate from the data processing system, and both the source and destination are transparent to the compute resources.

The writes may be mirrored using separate access requests directed to the source and the destination in parallel.

The computer-implemented method may also include tracking, by the NIC and while the migration is being performed, a portion of data of the emulated storage that is stored in the source and synchronized in the destination and a second portion of the data of the emulated storage that is stored in the source and not synchronized in the destination. The selectively read data may be selected based on the tracked portion of the data.

Tracking the portion of the data may include, when a write of the writes is mirrored, marking a third portion of the data of the emulated storage that is stored in the source as synchronized in the destination, the third portion of the data of the emulated storage that is stored in the source not being synchronized in the destination prior to the write of the writes and being modified by the write of the writes.

The computer-implemented method may also include, prior to completing the migration: suspending the migration; while the migration is suspended: suspending the mirroring of the writes to the destination, and tracking the writes that are not mirrored to the destination to identify a third portion of the data of the emulated storage that is stored in the source.

The computer-implemented method may additionally include, after the migration is suspended: updating the second portion of the data based on the third portion of the data; and using the updated second portion of the data to identify unsynchronized data.

The source may include a first physical storage and the destination may include a second physical storage.

The computer-implemented method may further include instantiating, by the NIC, the emulated storage; mapping, by the NIC, the source and the destination to the emulated storage; and treating, by the NIC, access requests directed to the source as being directed to the emulated storage.

A non-transitory media may include instructions that when executed by a processor cause the computer-implemented method to be performed.

A data processing system may include the non-transitory media and a processor (e.g., of a NIC), and may perform the computer-implemented method when the computer instructions are executed by the processor.

Turning to FIG. 1, a block diagram illustrating a system in accordance with an embodiment is shown. The system shown in FIG. 1 may facilitate performance of workloads (e.g., computer-implemented workloads performed by executing computing instructions with at least one processor of one or more data processing systems). The system may include to data processing system 100.

To perform the workloads, data processing system 100 may provide computer implemented services to users and/or other computing devices operably connected to data processing system 100. The computer implemented services may include any type and quantity of services including, for example, database services, instant messaging services, video conferencing services, etc. Different systems may provide similar and/or different computer implemented services.

To provide the computer implemented services, data processing system 100 may include various hardware resources such as compute resources 102, local storage 104, network interface controller (NIC) 110, and bus 106. Compute resources 102 may include hardware devices such as processors, memory modules, etc. Local storage 104 may include storage devices such as hard disk drives, solid state drives, storage controller, etc. NIC 110 may facilitate communication with other remote devices. For example, NIC 110 may facilitate communication with network storages 130. Any of the components of data processing system 100 may be operably connected to one another and/or other components (not shown) via bus 106.

When providing the computer implemented services, data may be stored for future use in local storage 104 and/or remote storage devices such as network storages 130 (and/or other remote storages). To facilitate use of network storages (and/or other remote or local storages), MC 110 may present an emulated storage (e.g., by presenting an emulated storage endpoint) to compute resources 102 via bus 106. Consequently, compute resources 102 may direct access requests (e.g., storage, read, delete) for the emulated storage to NIC 110 via bus 106. From the perspective of compute resources 102, the emulated storage may be a local device.

To implement the emulated storage, NIC 110 may use the storage resources of network storages 130 (and/or other remote or local storage devices operably connected to it). For example, network storages 130 may also include a NIC (not shown) that may include functionality to secure, format, and use storage resources local to network storages 130. When an access request for the emulated storage is received by NIC 110, NIC 110 may use translation tables, lookup tables, and/or implement various procedures for servicing the access request via network storages 130 and/or other storage devices. However, from the perspective of compute resources 102, the emulated storage may appear to be a bare metal device operably connected to compute resources 102 via bus 106. Compute resources 102 may be unaware of network storages 130 and/or the processes performed by NIC 110 to service access requests.

In general, embodiments disclosed herein relate to systems, methods, and devices for managing data storage in a distributed system. To manage data storage in a data processing system, NIC 110 may facilitate migrations of data from a source to a destination. As used herein, a migration may be a process through which data stored in a first storage is moved to a second storage for storage. A migration may be performed for various reasons such as, for example, the source failing to meet storage service expectations, the source lacking sufficient storage space, etc. Migrations may be performed for other reasons without departing from embodiments disclosed herein.

In an embodiment, the migrations are facilitated by NIC 110. NIC 110 may facilitate seamless migrations where access to stored data is not impeded during the migrations, and may be aborted without impeding access to the data. In contrast, migrations that are not seamless may restrict access to data while (e.g., during portions of time or entirely) the data is being migrated from a source to a destination.

To perform seamless migrations, NIC 110 may, for sources that are not emulated storages: (i) identify the source and a destination for the migration, (ii) establish an emulated storage with mappings to the source and the destination, (iii) route access requests to the source to the emulated storage during the migration, (iv) mirror writes to the emulated storage to both the source and the destination, (v) selective read from the source or the destination to service reads to the emulated storage, and (iv) store migration management data to track the migration process which may allow for migrations to be suspended, aborted, and/or resumed. For sources that are emulated storages, a mapping between the emulated storage and the destination may be established (a mapping between the emulated storage and a storage used by the emulated storage may already be in place).

By doing so, embodiments disclosed herein may facilitate seamless migration of data in a manner that is transparent to the host data processing system. Consequently, the host data processing system may be better secured by not requiring that the operating system, drivers, and/or other entities hosted by compute resources 102 perform actions to migrate data.

NIC 110 may be implemented with a hardware devices and/or software components hosted by the hardware devices. In an embodiment, NIC 110 is implemented using a hardware device including circuitry. The hardware device may be, for example, a digital signal processor, a field programmable gate array, system on a chip, or an application specific integrated circuit. The circuitry may be adapted to cause the hardware device to perform the functionality of NIC 110. NIC 110 may be implemented using other types of hardware devices without departing embodiments disclosed herein.

In one embodiment, NIC 110 is implemented using a processor adapted to execute computing code stored on a persistent storage that when executed by the processor performs the functionality of NIC 110 discussed throughout this application. The processor may be a hardware processor including circuitry such as, for example, a central processing unit, a processing core, a part of a system on a chip or other type of special purpose hardware device, or a microcontroller. The processor may be other types of hardware devices for processing information without departing embodiments disclosed herein.

Generally, NIC 110 may include functionality to process network data units such as packets. Packets may be exchanged with communication system 120, and devices operably connected to communication system 120 such as network storages 130. The communications between NIC 110 and network storages 130 may be encapsulated to obtain packets, and directed between network storages 130 and NIC 110 via communication system 120. The packets may be directed to different storages of the network storages 130, which may act as sources or destinations during migration.

Bus 106 may be implemented with one or more communication buses. The communications buses may support various communications standards. In an embodiment, bus 106 comprises a Peripheral Component Interconnect Express (PCIE) bus which connects compute resources 102 to NIC 110. NIC 110 may comply with the Non-Volatile Memory Express (NVMe) specification and support NVME communications.

NIC 110 may also support, NVME over fabric (NVMe-oF) communications (or other communication standards) and may communicate with network storages 130 and/or other local storage devices using NVMe-oF communications.

To support NVMe communications, NIC 110 may include functionality to present endpoints (e.g., addressable locations presented to other devices), establish initiators to facilitate communications between endpoints and the initiators, and/or implement other methods for communicating via bus 106, communication system 120, and/or other communications facilitates not illustrated in FIG. 1.

Figure 2:
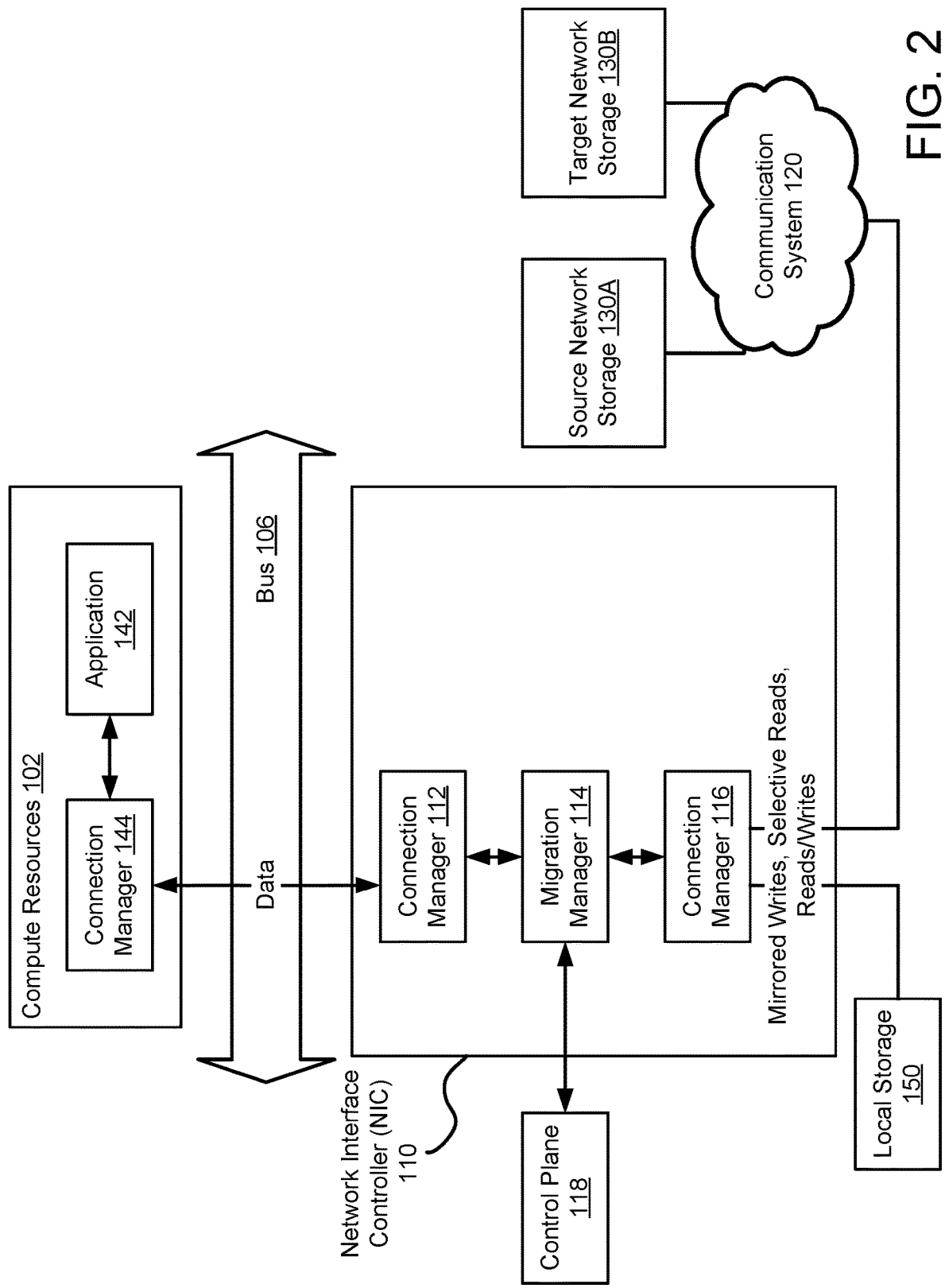
FIG. 2 shows a block diagram illustrating a network interface controller in accordance with an embodiment.

Refer to FIG. 2 for additional details regarding NIC 110.

Network storages 130 may be implemented using, for example, any number of network attached storage systems (e.g., storage arrays). The network attached storage systems may store data for various emulated storages presented by NIC 110.

In an embodiment, communication system 120 includes one or more networks that facilitate communication between any number of components. The networks may include wired networks and/or wireless networks (e.g., and/or the Internet). The networks may operate in accordance with any number and types of communication protocols (e.g., such as the internet protocol). Communication system 120 may include packetized communication.

To convey information via communication system 120, data structures (e.g., payloads) may be encapsulated (e.g., packetized) with control information compliant with the communication schemes supported by communication system 120. For example, communication system 120 may include the Internet and support internet protocol communications.

Any of data processing system 100, NIC 110, and network storages 130 may be implemented with a computing device such as a host or server, a personal computer (e.g., desktops, laptops, and tablets), a "thin" client, a personal digital assistant (PDA), a Web enabled appliance, embedded computing device such as a system on a chip, a mobile phone (e.g., Smartphone), and/or any other type of computing device or system. For additional details regarding computing devices, refer to FIG. 4.

While illustrated in FIG. 1 as including a limited number of specific components, a system in accordance with an embodiment may include fewer, additional, and/or different components than those illustrated therein.

As discussed above, NIC 110 may facilitate data migration for data processing system 100. Turning to FIG. 2, a diagram of NIC 110 in accordance with an embodiment is shown. As discussed above, data processing system 100 may utilize NIC 110 for data storage and migration purposes. To do so, NIC 110 may take special action with respect to access requests (e.g., read/writes) from compute resources 102. These actions may allow for data stored in a source (e.g., source network storage 130A) to be migrated to a destination (e.g., target network storage 130B) while facilitating unimpeded access to the data during the migration. For example, compute resources 102 may write data and read data that is being migrated with an expected level of service provided when the data is not being migrated.

To communicate with NIC, compute resources 102 may host connection manager 144. Connection manager 144 may generate access requests based on requests from applications 142 (and/or other entities hosted by compute resources 102), encapsulate them as necessary to comply with the communication scheme supported by bus 106, and transmit the encapsulated access request to an emulated storage device endpoint presented by NIC 110. In the context of data storage, the access request may include the data to be stored in the emulated storage.

Connection manager 144, in the context of NVMe communications, may be implemented with an NVMe initiator. The NVMe initiator may be implemented with a driver or other piece of software for sending communications via bus 106. Applications 142 and connection manager 144 may execute via compute resources 102. While not shown in FIG. 2, compute resources 102 may host an operating system (e.g., which may include connection manager 144) that mediates presentation of storage to applications 142. Connection manager 144 may be implemented differently to conform to different type of communications without departing from embodiments disclosed herein.

To present the emulated storage device endpoint to compute resources 102, NIC 110 may host connection manager 112. Connection manager 112 may present emulated storage device endpoints to other devices, such as data processing system 100. Connection manager 112 may present any number of such emulated endpoints. By doing so, NIC 110 may present any number of emulated storage devices to the compute resources of data processing system 100 and thereby allow for data from the compute resources to be transmitted to NIC 110, which may in turn store the data in other devices.

When communications are received by connection manager 112, the connection manager may identify a target emulated storage and initiate processing of the access requests based on the target. For example, connection manager 112 may pass the access requests to migration manager 114 which may handle processing of the access requests. The access requests may be processed in different manners depend on whether the target emulated storage is or is not subject to migration (e.g., migrating data between storage devices used by the emulated storage).

If the target is subject to migration, then migration manager 114 may perform write mirroring and/or selective reading based on the access requests. For example, migration manager 114 may, for write requests, mirror the write request to both the source and the destination. By doing so, the data stored in the source may be consistent with that stored in the emulated storage, while the destination is synchronized with the source.

For read requests, migration manager 114 may read from the source or destination depending on the workloads being imposed on the source/destination and whether the destination (or only the specific data attempting to be read) has been synchronized with the source with respect to the data that is requested to be read. For example, the migration manager 114 may preferentially read from the source or destination that has a lower workload, unless the requested data is not available in the respective source or destination. NIC 110 may include lookup tables or other data structures usable to ascertain which of a source and destination include requested data of the emulated storage.

To migrate the data from the source to the destination, migration manager 114 may issue read requests to the source and write requests for the read data to the destination. In this manner, the copy of the data stored in the source may be replicated in the destination.

To manage the migration process, migration manager 114 may store management data regarding whether various portions of the data from the source have been synchronized in the destination. For example, migration manager 114 may track data from the source that has been copied to the destination. When writes are mirrored to both the source and destination, migration manager 114 may update its management data to reflect that the newly written data to the source that has been synchronized (e.g., stored in) in the destination. By doing so, migration manager 114 may maintain a map (or other type of data structure) indicating whether portions of the data stored in the source have or have not been synchronized in the destination.

To establish when and under what conditions a migration is to be performed (e.g., to initiate special processing of access requests by migration manager 114), a control plane 118 may be utilized. Control plane 118 may manage the operation of data processing system 100. For example, control plane 118 may be implemented with a management device, or service, that manages how data processing system 100 operates. Control plane 118 may receive requests from administrators or other persons regarding where data for data processing system 100 should be stored, and may initiate migrations to conform the operation of data processing system 100 to that specified by the administrators. Consequently, control plane 118 may send instructions to migration manager 114 to (i) initiate a migration, (ii) suspend a migration, and/or (iii) terminate a migration. The instructions may also specify the source and/or destination for the migration.

Migration manager 114 may take action based on the instructions from control plane 118. For example, migration manager 114 may, when instructed to migrate data, map various sources and/or destinations, establish emulated storages based on the mapped sources and/or destinations, map destinations to existing emulated storages (e.g., in scenarios in which the source is an emulated storage, which may only need a mapped destination). These mappings may be maintained in a lookup table or other data structure.

In another example, migration manager 114 may, when instructed to terminate a migration, release the destination and terminate special processing of access requests. In a scenario where an emulated storage was established to facilitate migration, the source may be mapped back directly and the emulated storage may be deconstructed.

In an additional example, migration manager 114 may, when instructed to suspend a migration, stop special processing of access requests but may keep updating management data so that new data added to the source may be taken into account in the event that the migration is resumed. To do so, the new data added to the source may be tracked and may be marked as not yet synchronized at the destination.

Connection manager 116 may be implemented with, for example, a PCIe initiator, NVMe-oF initiator, and/or other communication protocol compliant initiators to facilitate communications between NIC 110 and storage devices (e.g., 130A, 130B, 150). Any of connection manager 112 and connection manager 116 may be implemented with, for example, a driver or other type of application.

In an embodiment, bus 106 is implemented as a PCIe bus. In such a scenario, the functionality of connection manager 112 may be implemented using a PCIe chipset hosted by NIC 110. The chipset may support both physical and virtual functions. The virtual functions may be used to manage presentation of any number of emulated storage devices. The physical and virtual functions may handle protocol specific requirements such as error handling, doorbells, interrupts, and/or other aspects of sending and receiving information via a physical bus.

In an embodiment, any of connection manager 112, migration manager 114, and connection manager 116 is implemented using a hardware device including circuitry. The hardware device may be, for example, a digital signal processor, a field programmable gate array, system on a chip, or an application specific integrated circuit. The circuitry may be adapted to cause the hardware device to perform the functionality of connection manager 112, migration manager 114, and/or connection manager 116. Connection manager 112, migration manager 114, and/or connection manager 116 may be implemented using other types of hardware devices without departing embodiment disclosed herein.

In one embodiment, any of connection manager 112, migration manager 114, and connection manager 116 is implemented using a processor adapted to execute computing code stored on a persistent storage that when executed by the processor performs the functionality of connection manager 112, migration manager 114, and/or connection manager 116 discussed throughout this application. The processor may be a hardware processor including circuitry such as, for example, a central processing unit, a processing core, or a microcontroller. The processor may be other types of hardware devices for processing information without departing embodiment disclosed herein.

Figure 3A:
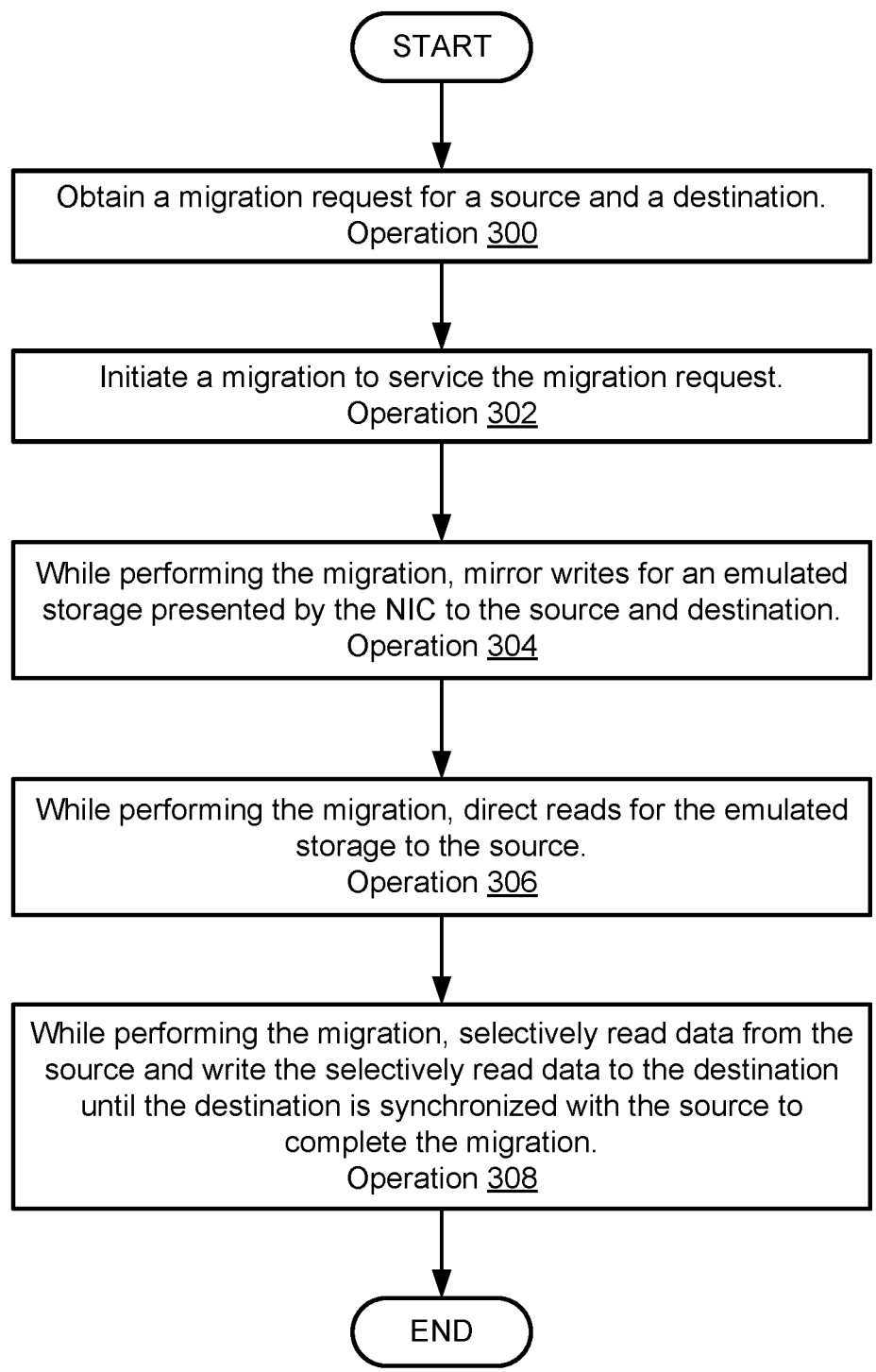
FIG. 3A shows a flow diagram illustrating a method of migrating data in accordance with an embodiment.
Figure 3B:
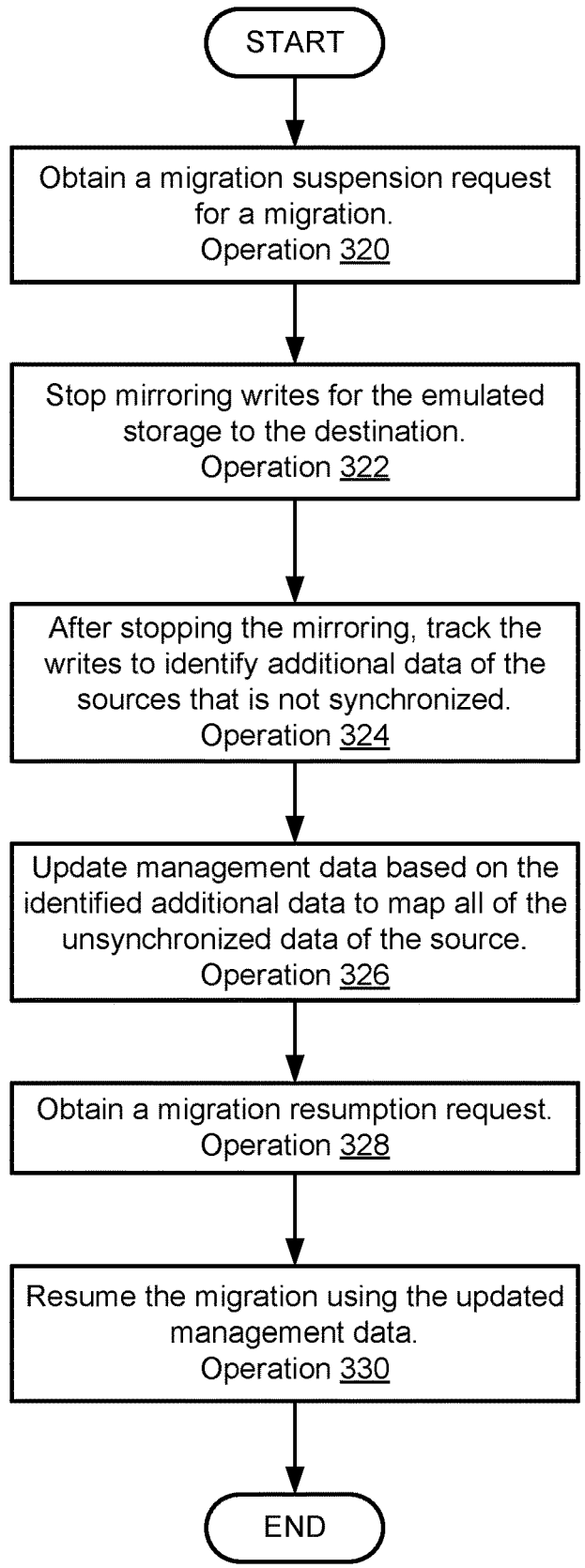
FIG. 3B shows a flow diagram illustrating a method of servicing a migration suspension request in accordance with an embodiment.

Connection manager 112, migration manager 114, and/or connection manager 116 may perform all, or a portion, of the methods illustrated in FIGS. 3A-3B.

While illustrated in FIG. 2 with a limited number of specific components, a NIC may include additional, fewer, and/or different components without departing from embodiments disclosed herein.

As discussed above, the components of FIG. 1 may perform various methods to migrate data from sources to destinations. FIGS. 3A-3B illustrate examples of methods that may be performed by the components of FIG. 1 when providing their functionalities. In the diagrams discussed below and shown in FIGS. 3A-3B, any of the operations may be repeated, performed in different orders, and/or performed in a parallel with other operations and/or a partially overlapping in time manner with other operations.

Turning to FIG. 3A, a flow diagram illustrating a method of migrating data in accordance with an embodiment is shown. The method may be performed by a NIC, a data processing system, a storage, and/or other components.

Prior to operation 300, a data processing system may store data in a source. The sources may be an emulated storage or non-emulated storage.

At operation 300, a migration request for a source and a destination are received. The migration request may be obtained from a control plane. The destination and source may be different storage devices.

At operation 302, a migration to service the migration request is initiated. To service the migration request, a NIC that will perform the migration may map the source and destination to an emulated storage.

When the source is an emulated storage, the storage device(s) being used by the emulated storage may be treated as the sources. The destination may be mapped by the NIC so that the NIC may be able to read and write to both the source and the destination. To map the destination, the NIC may communicate with the destination storage (e.g., through a NIC of the destination storage if the destination storage is remote) and request that various resources be allocated for use by the NIC, storage space be formatted, and/or other actions be performed. The NIC may also establish lookup tables or other data structures to guide its response to access requests directed to the emulated storage. For example, the data structures may indicate where mirrored writes are directed, how reads are serviced, etc.

When the source is not an emulated storage, the NIC may map both the non-emulated storage device and destination storage to a new emulated storage. The NIC may direct access requests for the storage to the emulated storage. By doing so, a similar arrangement of source and destination storages for the emulated storage may be arranged. Consequently, when access requests for the non-emulated storage are obtained, the NIC may treat them as being directed to the emulated storage, which may then allow use of lookup tables or other data structures to guide its response to access requests. Thus, a new emulated storage may be instantiated to facilitate migration between a source and destination.

At operation 304, writes for an emulated storage presented by the NIC are mirrored to the source and destination while the migration is performed. For example, when compute resources send access requests the reach the existing or newly instantiated emulated storage established in operation 302, two separate writes to the source and destination may be generated and sent to the source and destination, respectively. By doing so, both the source and destination may write the new or modified data at the same time. Consequently, neither source or destination will need to wait for the other to complete the write before writing the data from the write. This mirroring process may be transparent to the compute resources of the data processing system.

When data is written to the source and destination, management data maintained by the NIC may be updated. The management data may indicate that the written data has been synchronized across the sources and destination. If data of the source is overwritten, the overwritten data may be treated as being synchronized with the sources.

At operation 306, while performing the migration, reads for the emulated storage may be directed to the source. By mirroring the writes, the source may include a current copy of the data of the emulated storage. In contrast, the data of the destination may not be synchronized with the source and may not reflect the data of the emulated storage until the migration is complete. Consequently, write may be directed to the source because the destination may not have access to the data which may need to be read to service the read.

At operation 308, data from the source is selectively read and written to the destination until the destination is synchronized with the source to complete the migration. The data may be read using the management data which may indicate the portions of the data in the data in the source that have not been synchronized at the destination. The unsynchronized data of the source may be read in accordance with a strategy to improve the ability of migrations to be suspended and restarted. For example, the unsynchronized may be read in a predetermined order so that it may be less challenging to identify where to resume reading following any suspensions of the migration.

While the data is selectively read and written, the management data maintained by the NIC may be maintained. By doing so, a map of the unsynchronized data may be maintained that may allow to the unsynchronized data to be discriminated from the synchronized data of the source. The map may be maintained by tracking the portions of data of the emulated storage that are stored in the source and synchronized in the destination and tracking other portions of data of the emulated storage that are stored in the source and not synchronized in the destination. The tracking may be performed based on how the NIC processes incoming access requests for the emulated storage.

For example, as noted above, when writes are mirrored to the source and destination the written data may automatically be treated as being synchronized.

The management data may be maintained in any format an on any basis. For example, when access requests are obtained from compute resources, the access requests may supply a logical block address of the emulated storage. The NIC may maintain translation tables for the source and destination that translate the logical block addresses to physical block addresses. Thus, for a given logical block address, the corresponding physical blocks of the source and destination may be identified. In other scenarios, the source and destination storages may handle logical to physical block address translation. The synchronization state of data in the source and destination may be tracked by maintaining lists of the logical or physical blocks for the source and destination, and associate the respective synchronization states with these blocks.

The method may end following operation 308.

Following operation 308, the source may be released and reads/writes to the emulated storage may be directed to the destination.

Using the method illustrated in FIG. 3A, a system in accordance with an embodiment may facilitate migration of data without impacting the compute resources of the data processing system. For example, no software agents or configuration may need to be used by or supported by the compute resources. Rather, the NIC may entirely manage the migration, which may be transparent to the compute resources. In an embodiment, the compute resources of the data processing system and/or software stack hosted by the compute resources are hardened against compromise and/or include anti-compromise agents monitoring for write mirroring or redirection. These software agents may limit or prevent migrations managed or performed using the compute resources. Further, by removing the decision make processes for migrations from the compute resources, undesired migrations may be prevented from being initiated by vesting the migration management responsibility in the NIC.

However, once a migration is initiated, it may be suspended or terminated. Turning to FIG. 3B, a flow diagram illustrating a method of processing to a migration suspension request in accordance with an embodiment is shown. The method may be performed by a NIC, a data processing system, a storage, and/or other components.

At operation 320, a migration suspension request is obtained. The migration suspension request may be obtained from a control plane. The migration suspension request may be obtained by reading it in a message from the control plane. The migration suspension request may indicate that a migration being performed for a source and destination is to be suspended.

At operation 322, while the migration is suspended, write mirroring for the emulated storage is stopped. For example, during the migration write for the emulated storage that may cause data to be written to both the source and destination (e.g., mirrored) may be stopped. The writes to the emulated storage may only be directed to the source.

Selective reading and writing of data from the source to the destination may also be suspended.

At operation 324, while the migration is suspended, after the write mirroring is stopped, writes to the emulated storage may be tracked to identify added unsynchronized data of the source. The writes may be tracked by updating the management data to indicate that the data written to the source is unsynchronized. By doing so, the synchronization state of data stored in the source may be updated.

At operation 326, while the migration is suspended, management data is updated based on the identified added unsynchronized data. The updated management data may map all of the unsynchronized data of the source.

At operation 328, while the migration is suspended, a migration resumption request is obtained. The migration resumption request may be obtained from the control plane. The migration resumption request may request that the suspended migration be resumed.

At operation 330, the migration request is resumed using the updated management data. The migration request may be resumed by (i) resuming write mirroring and (ii) resuming selective reading and writing of unsynchronized data from the source to the destination. The updated management data may indicate the unsynchronized data from the source, thereby facilitating resumption.

The method may end following operation 330.

While not illustrated in FIG. 3B, if a migration abort request instead of a suspension request was received, then the destination may be released at operation 324, future reads/write may be directed to the sources, and the management data indicating the unsynchronized data of the source may be discarded (or archived for future use).

Using the method illustrated in FIG. 3B, migrations may be suspended, resumed, and/or aborted in a manner that is transparent to the compute resources of a data processing system. Consequently, the compute resources may be provided with unimpeded access to the data while the migration is suspended, resumed, and/or aborted.

Figure 4:
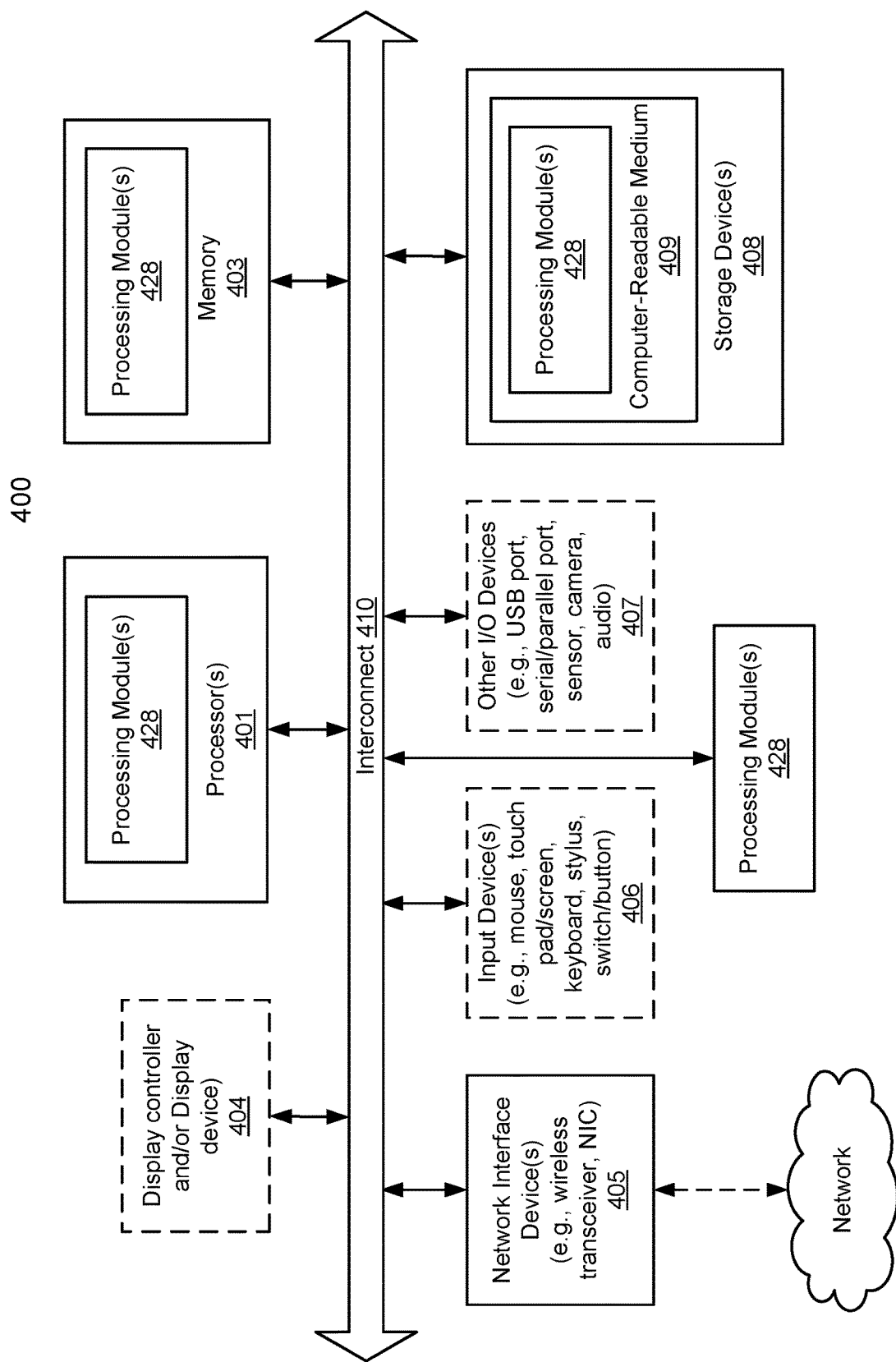
FIG. 4 shows a block diagram illustrating a data processing system in accordance with an embodiment.

Any of the components illustrated in FIGS. 1-2 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments as described herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A computer-implemented method for managing data storage in a distributed system, the method comprising:
    obtaining, by a Network Interface Controller (NIC) of a data processing system and from a control plane, a migration request for a source and a destination;
    based on the migration request and to perform a migration:
        mirroring, by the NIC, writes for an emulated storage presented by the NIC to both the source and the destination while the migration is being performed;
        directing, by the NIC, reads for the emulated storage to the source while the migration is being performed; and
        selectively reading, by the NIC, data from the source and writing, by the NIC, the selectively read data to the destination until the destination is synchronized with the source to complete the migration.

2. The computer-implemented method of claim 1, wherein the reads for the emulated storage and the writes for the emulated storage are obtained from compute resources of the data processing system and to which the NIC presents the emulated storage.

3. The computer-implemented method of claim 2, wherein the control plane is hosted by a device separate from the data processing system, and both the source and destination are transparent to the compute resources.

4. The computer-implemented method of claim 1, wherein the writes are mirrored using separate access requests directed to the source and the destination in parallel.

5. The computer-implemented method of claim 1, further comprising:
    tracking, by the NIC and while the migration is being performed, a portion of data of the emulated storage that is stored in the source and synchronized in the destination and a second portion of the data of the emulated storage that is stored in the source and not synchronized in the destination,
    wherein the selectively read data is selected based on the tracked portion of the data.

6. The computer-implemented method of claim 5, wherein tracking the portion of the data comprises:
    when a write of the writes is mirrored, marking a third portion of the data of the emulated storage that is stored in the source as synchronized in the destination, the third portion of the data of the emulated storage that is stored in the source not being synchronized in the destination prior to the write of the writes and being modified by the write of the writes.

7. The computer-implemented method of claim 5, further comprising:
    prior to completing the migration:
        suspending the migration;
        while the migration is suspended:
            suspending the mirroring of the writes to the destination, and
            tracking the writes that are not mirrored to the destination to identify a third portion of the data of the emulated storage that is stored in the source.

8. The computer-implemented method of claim 7, further comprising:
    after the migration is suspended:
        updating the second portion of the data based on the third portion of the data; and
        using the updated second portion of the data to identify unsynchronized data.

9. The computer-implemented method of claim 1, wherein the source comprises a first physical storage and the destination comprises a second physical storage.

10. The computer-implemented method of claim 9, further comprising:
    instantiating, by the NIC, the emulated storage;
    mapping, by the NIC, the source and the destination to the emulated storage; and
    treating, by the NIC, access requests directed to the source as being directed to the emulated storage.

11. A non-transitory machine-readable medium having instructions stored therein, which when executed by a processor, cause the processor to perform operations for managing data storage in a distributed system, the operations comprising:
    obtaining, by a Network Interface Controller (NIC) of a data processing system and from a control plane, a migration request for a source and a destination;
    based on the migration request and to perform a migration:
        mirroring, by the NIC, writes to an emulated storage presented by the NIC to the source and the destination while the migration is being performed;
        directing, by the NIC, reads to the emulated storage to the source while the migration is being performed; and
        selectively reading, by the NIC, data from the source and writing, by the NIC, the selectively read data to the destination until the destination is synchronized with the source to complete the migration.

12. The non-transitory machine-readable medium of claim 11, wherein the reads for the emulated storage and the writes for the emulated storage are obtained from compute resources of the data processing system and to which the NIC presents the emulated storage.

13. The non-transitory machine-readable medium of claim 12, wherein the control plane is hosted by a device separate from the data processing system, and both the source and destination are transparent to the compute resources.

14. The non-transitory machine-readable medium of claim 11, wherein the writes are mirrored using separate access requests directed to the source and the destination in parallel.

15. The non-transitory machine-readable medium of claim 11, wherein the operations further comprise:
   tracking, by the NIC and while the migration is being performed, a portion of data of the emulated storage that is stored in the source and synchronized in the destination and a second portion of the data of the emulated storage that is stored in the source and not synchronized in the destination,
   wherein the selectively read data is selected based on the tracked portion of the data.

16. A data processing system, comprising:
   compute resources; and
   a Network Interface controller (NIC), comprising:
      a processor, and
      a memory coupled to the processor to store instructions, which when executed by the processor, cause the processor to perform operations for managing data storage in a distributed system, the operations comprising:
         obtaining, from a control plane, a migration request for a source and a destination; based on the migration request and to perform a migration:
            mirroring writes to an emulated storage presented by the NIC to the source and the destination while the migration is being performed;
            directing reads to the emulated storage to the source while the migration is being performed; and
            selectively reading data from the source and writing, by the NIC, the selectively read data to the destination until the destination is synchronized with the source to complete the migration.

17. The data processing system of claim 16, wherein the reads for the emulated storage and the writes for the emulated storage are obtained from the compute resources and to which the NIC presents the emulated storage.

18. The data processing system of claim 17, wherein the control plane is hosted by a device separate from the data processing system, and both the source and destination are transparent to the compute resources.

19. The data processing system of claim 16, wherein the writes are mirrored using separate access requests directed to the source and the destination in parallel.

20. The data processing system of claim 16, wherein the operations further comprise:
   tracking, by the NIC and while the migration is being performed, a portion of data of the emulated storage that is stored in the source and synchronized in the destination and a second portion of the data of the emulated storage that is stored in the source and not synchronized in the destination,
   wherein the selectively read data is selected based on the tracked portion of the data.

* * * * *